US 6,962,889 B2
Nov. 8, 2005

(12) United States Patent
Zhu et al.

(54) SPHERICAL CATALYST FOR OLEFIN POLYMERIZATION

(75) Inventors: Zhidong Zhu, Houston, TX (US); Main Chang, Houston, TX (US)

(73) Assignee: Engelhard Corporation, Iselin, NJ (US)

(*) Notice: Subject to any disclaimer, the term of this patent is extended or adjusted under 35 U.S.C. 154(b) by 0 days.

(21) Appl. No.: 10/766,644

(22) Filed: Jan. 28, 2004

(65) Prior Publication Data

US 2005/0164873 A1 Jul. 28, 2005

(51) Int. Cl.[7] .................. B01J 31/00; B01J 37/00; C08F 4/02; C08F 4/60
(52) U.S. Cl. .................. 502/118; 502/116; 502/103; 525/53; 525/240; 526/65; 526/119; 526/114
(58) Field of Search .................. 502/118, 115, 116, 502/103; 526/142, 65, 119, 114; 525/53, 525/240

(56) References Cited

U.S. PATENT DOCUMENTS

| | | |
|---|---|---|
| 4,399,054 A | 8/1983 | Ferraris et al. |
| 4,499,194 A | 2/1985 | Harada et al. |
| 4,771,023 A | 9/1988 | Sasaki et al. |
| 4,784,983 A | 11/1988 | Mao et al. |
| 4,814,309 A * | 3/1989 | Seppanen et al. ........... 502/107 |
| 4,816,433 A | 3/1989 | Terano et al. |
| 4,829,038 A | 5/1989 | Hoppin et al. |
| 4,918,037 A * | 4/1990 | Seppanen .................... 502/107 |
| 4,923,937 A * | 5/1990 | Seppanen et al. ......... 526/124.6 |
| 4,927,797 A | 5/1990 | Ewen |
| 5,102,964 A * | 4/1992 | Kelland ...................... 526/128 |
| 5,177,043 A | 1/1993 | Koyama et al. |
| 5,194,531 A | 3/1993 | Toda et al. |
| 5,204,303 A | 4/1993 | Korvenoja et al. |
| 5,221,651 A | 6/1993 | Sacchetti et al. |
| 5,244,989 A | 9/1993 | Hara et al. |
| 5,247,032 A | 9/1993 | Kioka et al. |
| 5,346,972 A | 9/1994 | Duranel et al. |
| 5,374,695 A | 12/1994 | Tanaglia et al. |
| 5,438,110 A | 8/1995 | Ishimaru et al. |
| 5,459,116 A | 10/1995 | Ro et al. |
| 5,470,812 A * | 11/1995 | Mink et al. .................. 502/125 |
| 5,489,634 A | 2/1996 | Hara et al. |
| 5,500,396 A | 3/1996 | Martin |
| 5,514,634 A * | 5/1996 | Hagerty et al. ............. 502/125 |
| 5,523,358 A | 6/1996 | Hirose et al. |
| 5,576,259 A | 11/1996 | Hasegawa et al. |
| 5,684,173 A | 11/1997 | Hosaka et al. |
| 5,767,215 A | 6/1998 | Garoff et al. |
| 5,767,216 A | 6/1998 | Frances et al. |
| 5,773,537 A | 6/1998 | Mueller et al. |
| 5,817,590 A | 10/1998 | Hasegawa et al. |

(Continued)

FOREIGN PATENT DOCUMENTS

EP          0 018 737          11/1980

(Continued)

*Primary Examiner*—J. A. Lorengo
*Assistant Examiner*—Jennine Brown
(74) *Attorney, Agent, or Firm*—Raymond F. Keller

(57) ABSTRACT

Disclosed are catalyst systems and methods of making the catalyst systems/supports for the polymerization of an olefin containing a solid titanium catalyst component having a substantially spherical shape and containing a titanium compound and a support made from a magnesium compound and an alkyl silicate. The catalyst system may further contain an organoaluminum compound and an organosilicon compound. Also disclosed are methods of making an impact copolymer involving polymerizing an olefin to provide a polyolefin matrix and polymerizing a polyolefin rubber using a solid titanium catalyst component containing a titanium compound and a support made from a magnesium compound and an alkyl silicate.

21 Claims, 3 Drawing Sheets

U.S. PATENT DOCUMENTS

| | | | |
|---|---|---|---|
| 5,905,050 A | 5/1999 | Koshinen et al. | |
| 5,955,396 A | 9/1999 | Lee et al. | |
| 5,965,478 A | 10/1999 | Goto et al. | |
| 5,994,256 A * | 11/1999 | Lottes et al. | 502/107 |
| 6,075,151 A | 6/2000 | Hauser et al. | |
| 6,127,304 A | 10/2000 | Sacchetti et al. | |
| 6,136,745 A * | 10/2000 | Ashton et al. | 502/132 |
| 6,291,385 B1 | 9/2001 | Lee et al. | |
| 6,323,152 B1 | 11/2001 | Sacchetti et al. | |
| 6,329,315 B1 * | 12/2001 | Denton et al. | 502/232 |
| 6,407,028 B1 | 6/2002 | Sacchetti et al. | |
| 6,417,132 B1 | 7/2002 | Rong et al. | |
| 6,433,108 B1 * | 8/2002 | Malinge et al. | 526/65 |
| 6,437,061 B1 | 8/2002 | Sacchetti et al. | |
| 6,441,094 B1 * | 8/2002 | Cecchin et al. | 525/191 |
| 6,469,112 B2 | 10/2002 | Cheng et al. | |
| H002060 H | 3/2003 | Spencer et al. | |
| 6,544,921 B1 * | 4/2003 | Miyatake et al. | 502/125 |
| 6,627,710 B1 * | 9/2003 | Sacchetti et al. | 526/112 |
| 6,630,544 B1 | 10/2003 | Klendworth et al. | |
| 6,806,222 B2 * | 10/2004 | Yashiki et al. | 502/116 |
| 6,828,396 B2 * | 12/2004 | Miyatake et al. | 526/142 |
| 6,855,656 B2 * | 2/2005 | Hosaka et al. | 502/118 |
| 2002/0035028 A1 | 3/2002 | Jing et al. | |

FOREIGN PATENT DOCUMENTS

| | | |
|---|---|---|
| EP | 064 25 37 B1 | 10/1993 |
| EP | 086 04 52 A1 | 8/1998 |
| EP | 1 273 595 A1 | 1/2003 |
| JP | 5494590 | 7/1979 |
| JP | 3-140308 | 6/1991 |
| JP | 114813 | 4/2001 |
| JP | 114814 | 4/2001 |
| JP | 114815 | 4/2001 |
| WO | WO 93/11164 | 6/1993 |

* cited by examiner

SPHERICAL CATALYST FOR OLEFIN POLYMERIZATION

FIELD OF THE INVENTION

The present invention generally relates to olefin polymerization catalyst systems. In particular, the present invention relates to catalyst supports and catalyst systems for making olefin polymers and copolymers and methods of making the catalyst systems and olefin polymers and copolymers such as impact copolymers.

BACKGROUND OF THE INVENTION

Polyolefins are a class of polymers derived from simple olefins. Known methods of making polyolefins involve the use of Ziegler-Natta polymerization catalysts. These catalysts polymerize vinyl monomers using a transition metal halide to provide a stereoregulated polymer.

Numerous Ziegler-Natta polymerization catalysts exist. The catalysts have different characteristics and/or lead to the production of polyolefins having diverse properties. For example, certain catalysts have high activity while other catalysts have low activity, and similarly certain catalysts have a long life while other catalysts have a short life. Moreover, polyolefins made with the use of Ziegler-Natta polymerization catalysts vary in stereoregularity, molecular weight distribution, impact strength, melt-flowability, rigidity, heat sealability, isotacticity, and the like.

Impact copolymers are made of polyolefins and rubbers. While higher amounts of rubber in an impact copolymer increase the impact resistance, the higher amounts undesirably lower the flow properties of the copolymer. Lower amounts of rubber in an impact copolymer undesirably increase stiffness or rigidity, which in turn lowers the impact resistance.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides olefin polymerization catalyst systems, methods of making the olefin polymerization catalyst systems, and methods of polymerizing (and copolymerizing) olefins involving the use of a solid titanium catalyst component containing a catalyst support made from a magnesium compound and an alkyl silicate. Use of the alkyl silicate provides the solid titanium catalyst component and catalyst support with a substantially spherical shape and relatively large particle size.

The present invention provides methods of making an impact copolymer involving polymerizing an olefin to provide a polyolefin matrix and polymerizing a polyolefin rubber using a solid titanium catalyst component containing a titanium compound and a support made from a magnesium compound and an alkyl silicate.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
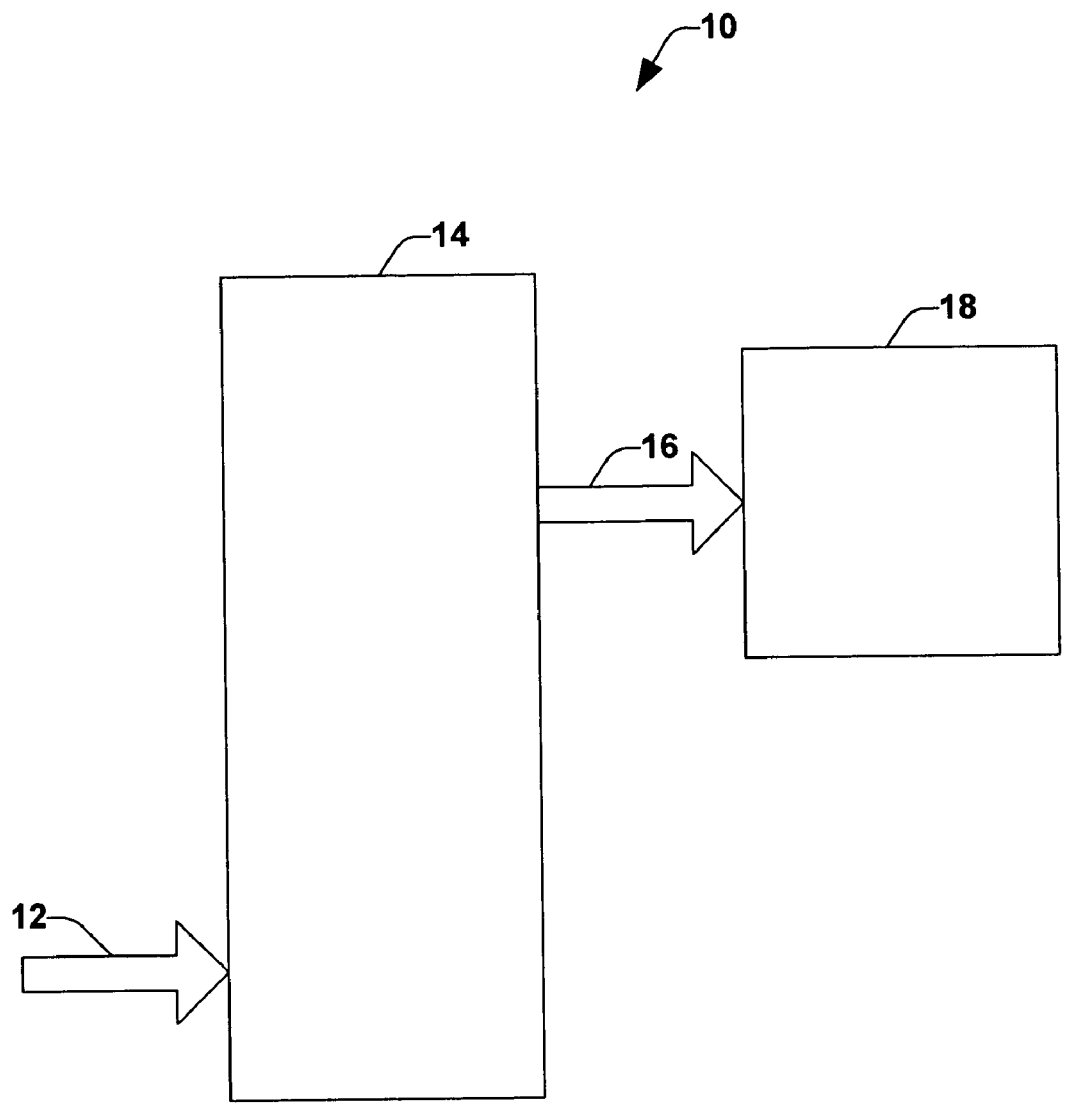
FIG. 1 is a high level schematic diagram of an olefin polymerization system in accordance with one aspect of the present invention.

The present invention relates to catalyst supports, solid titanium catalyst components, catalyst systems, methods of making catalyst supports, solid titanium catalyst components, and catalyst systems, and methods of making polyolefins including impact copolymers, such as polymer rubber intimately mixed in a polyolefin matrix.

An aspect of the invention is forming the catalyst support from a magnesium compound and an alkyl silicate. Use of the alkyl silicate contributes to the ability to form a catalyst support of relatively large size, and consequently, a solid titanium catalyst component of relatively large size. In one embodiment, the size (diameter) of catalyst support particles formed in accordance with the present invention is from about 30 microns to about 150 microns (on a 50% by volume basis). In another embodiment, the size (diameter) of catalyst support particles is from about 40 microns to about 100 microns (on a 50% by volume basis). In yet another embodiment, the size (diameter) of catalyst support particles is from about 50 microns to about 80 microns (on a 50% by volume basis).

There are a number of benefits associated with the relatively large catalyst supports and solid titanium catalyst components. The use of the alkyl silicate also contributes to the ability to form a catalyst support of substantially spherical shape, and consequently a solid titanium catalyst component of substantially spherical shape. The relatively large size and substantially spherical shape of the catalyst support and solid titanium catalyst component contribute to the ability of the catalyst system in various polymerization methods to provide an improved level of control over the properties of the resultant polymer product (glass transition temperature, adhesion properties, coefficients of temperature induced expansion/contraction, improved flowability, and the like).

Using an alkyl silicate to form a catalyst support permits one to eliminate the requirement of spray drying to form the catalyst support. Using an alkyl silicate to form a catalyst support also permits one to eliminate the requirement of a dealcohol step in forming the catalyst support. Using an alkyl silicate to form a catalyst support further permits one to mitigate waste streams commonly associated with forming catalyst supports and solid titanium catalyst components.

When the catalyst support is made using an alkyl silicate, a catalyst system is provided that produces polymer product having a controlled and/or relatively large size and shape. The shape of the resultant polymer product is substantially spherical. In one embodiment, using the catalyst support, catalyst system, and/or methods of the present invention, the polymer product has a substantially spherical shape and an average diameter of about 500 microns or more (on a 50% by volume basis). In another embodiment, the polymer product has a substantially spherical shape and an average diameter of about 1,000 microns or more (on a 50% by volume basis). In yet another embodiment, the polymer product has a substantially spherical shape and an average diameter of about 1,500 microns or more (on a 50% by volume basis). The relatively large size of the polymer product permits the polymer product to contain a high amount of rubber without deleteriously affecting flow properties.

The present invention further relates to an olefin polymerization catalyst system formed from a solid titanium catalyst component comprising titanium and a catalyst support made from a magnesium compound and an alkyl silicate; an organoaluminum compound; and an organosilicon compound, or a derivative derived from any of these groups; and a polymerization process which comprises polymerizing or copolymerizing olefins in the presence of the polymerization catalyst system described above.

Generally speaking, the magnesium based catalyst support is made by contacting at least one magnesium compound and at least one alkyl silicate in an organic medium under elevated temperatures (above room temperature). When the magnesium compound is subsequently reconstituted, recrystallized, and/or recovered, it has a relatively large particle size and substantially spherical shape. These desirable and beneficial properties are not obtained when the alkyl silicate is otherwise not employed.

The magnesium compounds used in the preparation of the catalyst support and ultimately the solid titanium catalyst component include, for example, a magnesium compound having no reducibility. Specific examples of the magnesium compound having no reducibility include magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and carboxylic acid salts of magnesium such as magnesium laurate and magnesium stearate. These magnesium compounds may be in the liquid or solid state.

The magnesium compound having no reducibility may be a compound derived from the magnesium compound having reducibility separately or at the time of preparing the catalyst component. This is effected, for example, by contacting the magnesium compound having reducibility with such a compound as a polysiloxane compound, a halogen-containing silane compound, a halogen-containing aluminum compound, an ester or an alcohol. In addition to the above magnesium compounds having no reducibility, the magnesium compound used in this invention may also be a complex compound or a double compound with another metal or a mixture with another metal compound.

In one aspect of the present invention, the magnesium compounds having no reducibility are preferred. In another aspect of the present invention, halogen-containing magnesium compounds, such as magnesium chloride, alkoxy magnesium chlorides and aryloxy magnesium chlorides, are preferred.

Alkyl silicates directly contribute to many of the beneficial properties of the catalyst support and catalyst system. General examples of alkyl silicates include tetraalkylorthosilicates, and the like. Examples of alkyl silicates include tetramethylorthosilicate, tetraethylorthosilicate, tetrapropylorthosilicate, tetrabutylorthosilicate, diethyldimethylorthosilicate, and the like.

The organic medium in which the magnesium compound and an alkyl silicate are contacted include one or more organic solvents and/or organic liquids. Preferably the organic solvent is capable of at least partially dissolving the magnesium compound. Examples of organic solvents include oxygen containing compounds such as alcohols and glycols, ketones, esters, ethers, and the like. Examples of alcohols include methanol, ethanol, propanol, butanol, pentanol, hexanol, cyclohexanol, and the like. The magnesium compound, an alkyl silicate, and organic medium can be combined in any order (all three at once; the magnesium compound and the organic medium initially combined, followed by addition of the alkyl silicate; or the alkyl silicate and the organic medium initially combined, followed by addition of the magnesium compound).

The mixture of the magnesium compound, alkyl silicate and organic medium is heated above room temperature for a suitable amount of time. In one embodiment, the mixture is heated to a temperature from about 40° C. to about 200° C. In another embodiment, the mixture is heated to a temperature from about 50° C. to about 175° C. In yet another embodiment, the mixture is heated to a temperature from about 75° C. to about 150° C. In one embodiment, the mixture is heated for a period of time from about 5 minutes to about 15 hours. In another embodiment, the mixture is heated for a period of time from about 10 minutes to about 10 hours.

Optionally, the mixture may be emulsified by adding an immiscible liquid, such as mineral oil. The emulsified mixture may be heated under the temperatures described above for the mixture. Optionally, the mixture or emulsified mixture is mixed, such as from about 100 rpm to about 2,500 rpm including from about 250 rpm to about 1500 rpm.

The magnesium based catalyst support is recovered from the mixture or emulsified mixture by any suitable means. For example, the mixture/emulsified mixture can be cooled causing the magnesium based catalyst support to form in solution; extracted and then cooled; spray dried; and the like. In one embodiment, however, the magnesium based catalyst support is not formed using spray drying. In another embodiment, the magnesium based catalyst support is not dealcoholed. In yet another embodiment, the magnesium based catalyst support does not comprise silica and/or silicon. While the alkyl silicate is necessary to form the magnesium based catalyst support, the magnesium based catalyst support does not contain notable amounts of the alkyl silicate (less than about 2% by weight, and even less than about 1% by weight).

The solid titanium catalyst component used in this invention is a highly active catalyst component comprising at least titanium and a magnesium containing catalyst support made with an alkyl silicate. In one embodiment, a solid titanium catalyst component containing magnesium, titanium, halogen and an internal electron donor is employed because activity is sometimes increased and it gives a polymer having high stereoregularity.

The solid titanium catalyst component may be prepared by contacting a catalyst support made with an alkyl silicate, as described above, and a titanium compound. The titanium compound used in the preparation of the solid titanium catalyst component in the present invention is, for example, a tetravalent titanium compound represented by Formula (I)

$$Ti(OR)_g X_{4-g} \quad (I)$$

wherein R represents a hydrocarbon group, preferably an alkyl group having 1 to about 4 carbon atoms, X represents a halogen atom, and $0 \leq g \leq 4$. Specific examples of the titanium compound include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\ n\text{-}C_4H_9)Cl_3$, $Ti(OC_2H_5)Br_3$ and $Ti(O\ iso\text{-}C_4H_9)Br_3$; dialkoxytitanium dihalides such as $Ti(OCH_3)_2\ Cl_2$, $Ti(OC_2H_5)_2Cl_2$, $Ti(O\ n\text{-}C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxytitaniums such as $Ti(OCH_3)_4$, $Ti(OC_2H_5)_4$ and $Ti(O\ n\text{-}C_4H_9)_4$.

Among these, the halogen containing titanium compounds, especially titanium tetrahalides, are preferred in some instances. These titanium compounds may be used individually or in a combination of two or more. They may be used as dilutions in hydrocarbon compounds or halogenated hydrocarbons.

In one embodiment of the preparation of the solid titanium catalyst component, it is preferred to use an internal electron donor, for example, oxygen-containing electron donors such as alcohols, certain organosilicon compounds, phenols, ketones, aldehydes, carboxylic acids, organic or inorganic acid esters, ethers, acid amides and acid anhydrides, and nitrogen-containing electron donors such as ammonia, amines, nitriles and isocyanates. Specific examples include alcohols having 1 to about 18 carbon atoms which may have an alkyl group such as methanol, ethanol, propanol, pentanol, hexanol, octanol, 2-ethylhexanol, dodecanol, octadecyl alcohol, benzyl alcohol, phenylethyl alcohol, cumyl alcohol and isoplropylbenzyl alcohol; phenols having 6 to about 25 carbon atoms such as phenol, resol, xylenol, ethylphenol, propylphenol, cumylphenol, nonylphenol and naphthol; ketones having about 3 to about 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; organic acid esters having 2 to about 30 carbon atoms such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, dioctyl phthalate, gamma-butyrolactone, deltavalerolactone, coumarine, phthalide and ethylene carbonate; inorganic acid esters such as ethyl silicate, butyl silicate, vinyltriethoxysilane, phenyltriethoxysilane and diphenyldiethoxysilane; acid halides having 2 to about 15 carbon atoms such as acetyl chloride, benzoyl chloride, tolyl chloride, anisoyl chloride and phthaloyl dichloride; ethers having 2 to about 20 carbon atoms such as methyl ether, ethyl ether, isopropyl ether, butyl ether, amyl ether, tetrahydrofuran, anisole and diphenyl ether; acid amides such as acetamide, benzamide and toluamide; acid anhydrides such as benzoic anhydride and phthalic anhydride, amines such as methylamine, ethylamine, diethylamine, tributylamine, piperidine, tribenzylamine, aniline, pyridine, picoline and tetramethylethylenediamine; and nitriles such as acetonitrile, benzonitrile and tolunitrile.

An organosilicon compound represented by Formula (II)

$$R_nSi(OR')_{4-n} \quad (II)$$

wherein R and R' represent a hydrocarbon group, and n is $0 \leq n \leq 4$. may also be used as the internal electron donor. Specific examples of the organosilicon compound of Formula (II) include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-p-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norboranetriethoxysilane, 2-norbornanemethyldimethoxysilane, ethyl silicate, butyl silicate, trimethylphenoxysilane, methyltriallyloxysilane, vinyltris(betamethoxyethoxysilane), vinyltriacetoxysilane, and dimethyltetraethoxydisiloxane.

Esters may also be employed as internal electron donors for use with the titanium catalyst component. Examples of these esters are compounds represented by the following formulae

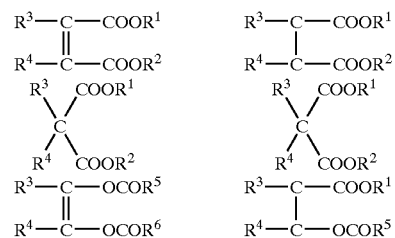

wherein $R^1$ represents a substituted or unsubstituted hydrocarbon group, and $R^2$, $R^5$ and $R^6$ represent a hydrogen atom or a substituted or unsubstituted hydrocarbon group, $R^3$ and $R^4$ represent a hydrogen atom or a substituted or unsubstituted hydrocarbon group, at least one of them is preferably a substituted or unsubstituted hydrocarbon group, and $R^3$ and $R^4$ may be linked to each other. In one embodiment, the substituted or unsubstituted hydrocarbon groups contain from 1 to about 30 carbon atoms.

Examples of the substituted hydrocarbon groups for $R^1$ through $R^5$ are hydrocarbon groups having groups containing hetero atoms such as N, O and S, for example, C—O—C, COOR, COOH, OH, $SO_3H$, —C—N—C— and $NH_2$. Especially preferred are diesters of dicarboxylic acids in which at least one of $R^1$ and $R^2$ is an alkyl group having at least about 2 carbon atoms.

Specific examples of polycarboxylic acid esters include aliphatic polycarboxylic acid esters such as diethyl succinate, dibutyl succinate, diethyl methylsuccinate, diisobutyl alpha-methylglutarate, dibutyl malonate, diethyl methylmalonate, diethyl ethylmalonate, diethyl isopropylmalonate, diethyl butyl malonate, diethyl phenylmalonate, diethyl diethylmalonate, diethyl allylmalonate, diethyl diisobutylmalonate, diethyl di-n-butylmalonate, dimethyl maleate, monooctyl maleate, dioctyl maleate, dibutyl maleate, dibutyl butylmaleate, diethyl butylmaleate, diisopropyl beta-methylglutarate, diallyl ethylsuccinate, di-2-ethylhexyl fumarate, diethyl itaconate, dibutyl itaconate, dioctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate and Nadic acid, diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethlisobutyl phthalate, ethyl-n-butyl phthalate, di-n-propyl phthalate, diisopropyl phthalate, di-n-butyl phthalate, diisobutyl phthalate, di-n-heptyl phthlate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthlenedicarboxylate, triethyl trimelliatate and dibutyl trimellitate; and heterocyclic polycarboxylic acid esters such as 3,4-furanedicarboxylic acid esters. Specific examples of the polyhydroxy compound esters may include 1,2-diacetoxybenzene, 1-methyl-2,3-diacetoxybenzene, 2-methyl-2,3-diacetoxybenzene, 2,8-diacetoxynaphthalene, ethylene glycol dipivalate and butanediol pivalate. Specific examples of the hydroxy-substituted carboxylic acid esters are benzoylethyl salicylate, acetylisobutyl salicylate and acetylmethyl salicylate.

Long-chain dicarboxylic acid esters, such as diethyl adipate, diisobutyl adipate, diisopropyl sebacate, di-n-butyl sebacate, di-n-octyl sebacate and di-2-ethylhexyl sebacate, may also be used as the polycarboxylic acid esters that can be included in the titanium catalyst component. Among these polyfunctional esters, compounds having the skeletons given by the above general formulae are preferred. Also preferred are esters formed between phthalic acid, maleic acid or substituted malonic acid and alcohols having at least about 2 carbon atoms, diesters formed between phthalic acid and alcohols having at least about 2 carbon atoms are especially preferred.

Another group of internal electron donors that can be included in the titanium catalyst component are monocarboxylic acid esters represented by RCOOR' where R and R' are hydrocarboyl groups that may have a substituent, and at least one of them is a branched (including alicyclic) or ring-containing aliphatic group. Specifically, at least one of R and R' may be $(CH_3)_2CH$—, $C_2H_5CH(CH_3)$—, $(CH_3)_2CHCH_2$—, $(CH_3)_3C$—, $C_2H_5CH$—, $(CH_3)CH_2$—, cyclohexyl, methylbenzyl, para-xylyl, acrylic, and carbonylbenzyl. If either one of R and R' is any of the above-described group, the other may be the above group or another group such as a linear or cyclic group. Specific examples of the monocarboxylic acid esters include monoesters of dimethylacetic acid, trimethylacetic acid, alpha-methylbutyric acid, beta-methylbutyric acid, methacrylic acid and benzoylacetic acid; and monocarboxylic acid esters formed with alcohols such as isopropanol, isobutanol and tert-butanol.

Carbonic acid esters may also be used as the internal electron donor. Specific examples are diethyl carbonate, ethylene carbonate, diisopropyl carbonate, phenylethyl carbonate and diphenyl carbonate.

The optional internal electron donors may be used individually or in combination. In employing the internal electron donor, they do not have to be used directly as starting materials, but compounds convertible to the electron donors in the course of preparing the titanum catalyst components may also be used as the starting materials.

The solid titanium catalyst component may be formed by contacting the magnesium containing catalyst support and the titanium compound and optionally, the internal electron donor by known methods used to prepare a highly active titanium catalyst component from a magnesium support, a titanium compound and optionally an electron donor. The above compounds may be contacted in the presence of another reaction agent such as silicon, phosphorus or aluminum.

Several examples of the method of producing the solid titanium catalyst component are briefly described below.

(1) The magnesium based catalytic support optionally with the internal electron donor, is reacted with the titanium compound in the liquid phase. This reaction may be carried out in the presence of a pulverizing agent. Compounds which are solid may be pulverized before the reaction.

(2) The magnesium based catalytic support having no reducibility and the titanium compounds are reacted in the presence of the optional internal electron donor to precipitate a solid titanium complex.

(3) The reaction product obtained in (2) is further reacted with the titanium compound.

(4) The reaction product obtained in (1) or (2) is further reacted with the internal electron donor and the titanium compound.

(5) The magnesium based catalytic support and the optional internal electron donor is pulverized in the presence of the titanium compound, and the resulting solid product is treated with a halogen, a halogen compound or an aromatic hydrocarbon. In this method, the magnesium based catalytic support with the electron donor may be pulverized in the presence of a pulverizing agent, etc. Alternatively, the magnesium based catalytic support and the optional internal electron donor is pulverized in the presence of the titanium compound, preliminarily treated with a reaction aid and thereafter, treated with halogen, etc. The reaction aid may be an organoaluminum compound or a halogen-containing silicon compound.

(6) The product obtained in (1) to (4) is treated with a halogen, a halogen compound or an aromatic hydrocarbon.

(7) A magnesium based catalytic support is reacted with the optional internal electron donor, the titanium compound and/or a halogen-containing hydrocarbon.

In embodiments of making the solid titanium catalyst component according to examples (2), (3), (4) and (6), the magnesium based catalytic support solution is mixed with liquid titanium tetrahalide to form a solid precipitate in the presence of an auxiliary precipitant. A polycarboxylic acid ester may be added before, during or after the precipitation of the solids and loaded on the solid.

The process of solids precipitation can be carried out by at least one of two methods. One method involves mixing liquid titanium tetrahalide with magnesium based catalytic support at a temperature in the range of about −40° C. to about 0° C., and precipitating the solids while the temperature is raised slowly to a range from about 30° C. to about 120° C., such as from about 60° C. to about 100° C. The other method involves adding liquid titanium tetrahalide dropwise into a magnesium based catalytic support solution at low or room temperature to precipitate out solids immediately. In both methods, an internal electron donor is desirably present in the reaction system. The optional internal electron donor can be added either after the magnesium based catalytic support solution is obtained or together with magnesium based catalytic support. Alternatively, two or more auxiliary precipitants can be added simultaneously.

The solids are treated by adding a polycarboxylic acid ester into the system after the precipitation process. Alternatively, a polycarboxylic acid ester can be added during the precipitation process. A mixture of two or more polycarboxylic acid esters can be used.

To facilitate obtaining uniform solid particles, the process of precipitation can be carried out slowly. When the second method of adding titanium halide dropwise at low or room temperature is applied, the process may take place over a period from about 1 hour to about 6 hours. When the first method of raising the temperature in a slow manner is applied, the rate of temperature increase can range from about 4° C. to about 100° C. per hour.

The solid precipitate is first separated from the mixture. In the solid precipitate thus obtained may be entrained a variety of complexes and impurities, so that further treatment may in some instances be necessary.

The solid precipitate is washed with an inert diluent and then treated with titanium tetrahalide or a mixture of titanium tetrahalide and an inert diluent. The titanium tetrahalide used in this act is identical to or different with the titanium tetrahalide used in the second act. The amount of titanium tetrahalide used is from about 1 to about 20 moles, such as from about 2 to about 15 moles, per mole of magnesium halide in the support. The treatment temperature ranges from about 50° C. to about 150° C., such as from about 60° C. to about 100° C. If a mixture of titanium tetrahalide and inert diluent is used to treat the solid precipitate, the volume % of titanium tetrahalide in the treating solution is from about 10% to about 100%, the rest being an inert diluent.

The treated solids can be further washed with an inert diluent to remove ineffective titanium compounds and other impurities. The inert diluent herein used can be hexane, heptane, octane, 1,2-dichloroethane, benzene, toluene and other hydrocarbons.

In one embodiment, particularly embodiments following example (2) described above, the solid catalyst component has the following chemical composition: titanium, from about 1.5 to about 6.0 wt %; magnesium, from about 10 to about 20 wt %; halogen, from about 40 to about 70 wt %; polycarboxylic acid ester, from about 5 to about 25 wt %; optionally organic phosphorus compounds, from about 0.1 to about 2.5 wt %; and optionally inert diluent from about 0 to about 15 wt %.

The amounts of the ingredients used in preparing the solid titanium catalyst component may vary depending upon the method of preparation. In one embodiment, from about 0.01 to about 5 moles of the internal electron donor and from about 0.01 to about 500 moles of the titanium compound are used per mole of the magnesium compound used to make the solid titanium catalyst component. In another embodiment, from about 0.05 to about 2 moles of the internal electron donor and from about 0.05 to about 300 moles of the titanium compound are used per mole of the magnesium compound used to make the solid titanium catalyst component.

In one embodiment, in the solid titanium catalyst component, the atomic ratio of halogen/titanium is from about 4 to about 200; the internal electron donor/titanium mole ratio is from about 0.01 to about 10; and the magnesium/titanium atomic ratio is from about 1 to about 100. In another embodiment, in the solid titanium catalyst component, the atomic ratio of halogen/titanium is from about 5 to about 100; the internal electron donor/titanium mole ratio is from about 0.2 to about 6; and the magnesium/titanium atomic ratio is from about 2 to about 50.

The resulting solid titanium catalyst component generally contains a magnesium halide of a smaller crystal size than commercial magnesium halides and usually has a specific surface area of at least about 50 m$^2$/g, such as from about 60 to 1,000 m$^2$/g, or from about 100 to 800 m$^2$/g. Since, the above ingredients are unified to form an integral structure of the solid titanium catalyst component, the composition of the solid titanium catalyst component does not substantially change by washing with hexane.

The solid titanium catalyst component may be used alone. If desired, it can be used after being diluted with an inorganic or organic compound such as a silicon compound, an aluminum compound or a polyolefin. In some instances when such a diluent is used, the catalyst component may show high catalytic activity even when it has a lower specific surface than that described above.

Methods of preparing the active catalyst component, which can be used in the present invention so long as the catalyst support made with an alkyl silicate is used, are described in U.S. Pat. Nos. 4,771,023; 4,784,983; 4,829,038; 4,861,847; 4,990,479; 5,177,043; 5,194,531; 5,244,989; 5,438,110; 5,489,634; 5,576,259; and 5,773,537; which are hereby incorporated by reference in this regard.

The catalyst system may contain at least one organoaluminum compound in addition to the solid titanium catalyst component. Compounds having at least one aluminum-carbon bond in the molecule can be used as the organoaluminum compound. Examples of organoaluminum compounds include compounds of the following Formulae (III) and (IV).

$$R_m^{11}Al(OR^{12})_nH_pX_q^1 \tag{III}$$

In Formula (III), $R^{11}$ and $R^{12}$ may be identical or different, and each represent a hydrocarbon group usually having 1 to about 15 carbon atoms, preferably 1 to about 4 carbon atoms; $X^1$ represents a halogen atom, $0<3$, $0\leq p<3$, $0\leq n<3$, and $m+n+p+q=3$.

Organoaluminum compounds further include complex alkylated compounds between aluminum and a metal of Group I represented by Formula (IV)

$$M^1AlR_4^{11} \tag{IV}$$

wherein $M^1$ represents Li, Na or K, and $R^{11}$ is as defined above.

Examples of the organoaluminum compounds Formula (III) are as follows:
compounds of the general formula $R_m^{11}Al(OR^{12})_{3-m}$ wherein $R^{11}$ and $R^{12}$ are as defined, and m is preferably a number represented by $1.5\leq m\leq 3$;
compounds of the general formula $R_m^{11}AlX_{3-m}^1$ wherein $R^{11}$ is as defined, $X^1$ is halogen, and m is preferably a number represented by $0<M<3$;

compounds of the general formula $R_m^{11}AlH_3$-m wherein $R^{11}$ is as defined above, and m is preferably a number represented by $2 \leq m < 3$; and compounds represented by the general formula $R^{m11}Al(OR^{12})_nX_q^1$ wherein $R^{11}$ and $R^{12}$ are as defined, $X^1$ is halogen, $0<3$, $0 \leq n<3$, m+n+q="3."

Specific examples of the organoaluminum compounds represented by Formula (III) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition represented by $R_{2.5}^{11}Al(OR^{12})_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; other partially hydrogenated alkyl aluminum, for example alkyl aluminum dihyrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Organoaluminum compounds further include those similar to Formula (III) such as in which two or more aluminum atoms are bonded via an oxygen or nitrogen atom. Examples are $(C_2H_5)_2AlOAl(C_2H_5)_2$, $(C_4H_9)_2AlOAl(C_4H_9)_2$,

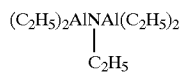

and methylaluminoxane.

Examples of organoaluminum compounds represented by Formula (IV) include $LiAl(C_2H_5)_4$ and $LiAl(C_7H_{15})_4$.

The organoaluminum compound catalyst component is used in the catalyst system of the present invention in an amount that the mole ratio of aluminum to titanium (from the solid catalyst component) is from about 5 to about 1,000. In another embodiment, the mole ratio of aluminum to titanium in the catalyst system is from about 10 to about 700. In yet another embodiment, the mole ratio of aluminum to titanium in the catalyst system is from about 25 to about 400.

The catalyst system may contain at least one organosilicon compound in addition to the solid titanium catalyst component. This organosilicon compound is sometimes termed an external electron donor. The organosilicon compound contains silicon having at least one hydrocarbon ligand (hydrocarbon group). General examples of hydrocarbon groups include alkyl groups, cycloalkyl groups, (cycloalkyl)methylene groups, alkene groups, aromatic groups, and the like.

The organosilicon compound is used in the catalyst system of the present invention in an amount that the mole ratio of the organoaluminum compound to the organosilicon compound is from about 2 to about 90. In another embodiment, the mole ratio of the organoaluminum compound to the organosilicon compound is from about 5 to about 70. In yet another embodiment, the mole ratio of the organoaluminum compound to the organosilicon compound is from about 7 to about 35.

In one embodiment, the organosilicon compound contains in its structure a (cycloalkyl)methylene group, or a derivative of any one of these groups may be used, such as a norpinanes and pinanes. In one embodiment, the organosilicon compound contains one (cycloalkyl)methylene moiety. In another embodiment, the organosilicon compound contains two (cycloalkyl)methylene moieties that are the same or different.

Organosilicon compounds containing at least one (cycloalkyl)methylene moiety can be represented by Formula (V):

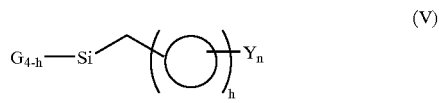

wherein the circle represents one or more cycloalkyl moieties, each G is independently an alkoxy group including methoxy and ethoxy groups or a hydrocarbon group including alkyl groups, such as methyl, ethyl, propyl, butyl, cyclopropyl, cyclopentyl, cyclohexyl, and 2-ethylhexyl groups; h is 1 to 4 or 1 to 2; each Y is independently a hydrocarbon group including those mentioned above, hydroxy, or halogen; and n is 0 to 3, 0 to 2, or 1 to 2. The alkoxy, alkyl, and hydrocarbon groups typically contain 1 to about 8 carbon atoms.

Organosilicon compounds containing at least one (cycloalkyl)methylene moiety can also be represented by one or more of Formulae (VI), (VII), (VIII), (IX), and (X):

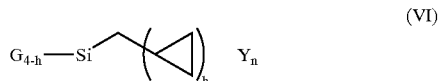

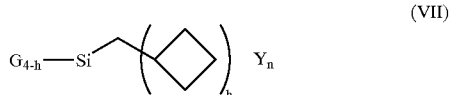

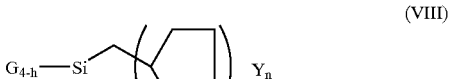

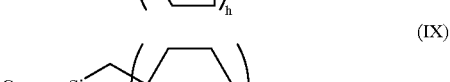

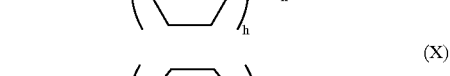

wherein each G is independently an alkoxy group including methoxy and ethoxy groups or a hydrocarbon group including alkyl groups, such as methyl, ethyl, propyl, butyl, cyclopropyl, cyclopentyl, cyclohexyl, and 2-ethylhexyl groups; h is 1 to 4 or 1 to 2; each Y is independently a hydrocarbon group including those mentioned above, hydroxy, or halogen; and n is 0 to 3, 0 to 2, or 1 to 2.

Additional examples of organosilicon compounds are those of the following Formulae (XI), (XII), (XIII), (XIV), (XV), (XVI), (XVII), (XVIII), (XIX), (XX), (XXI), and (XXII):

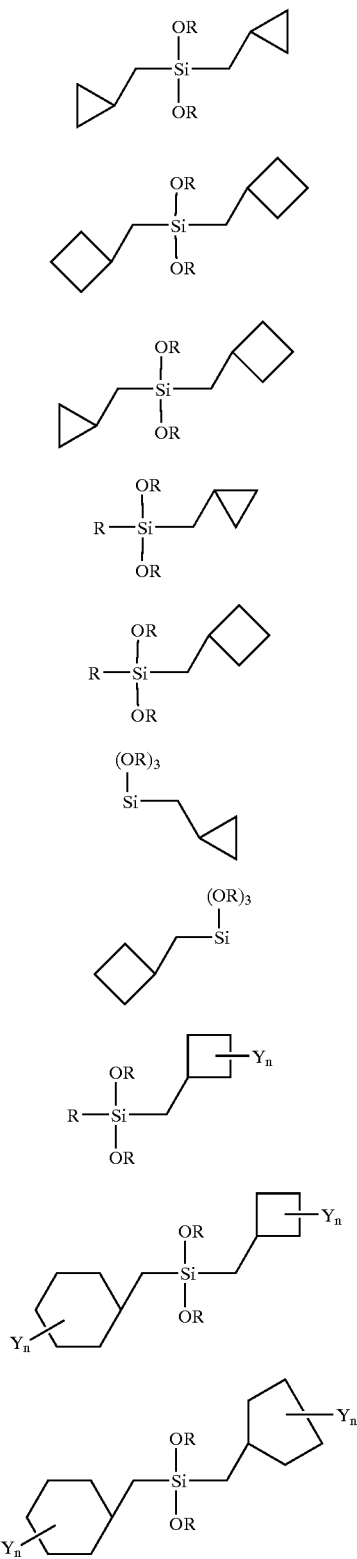
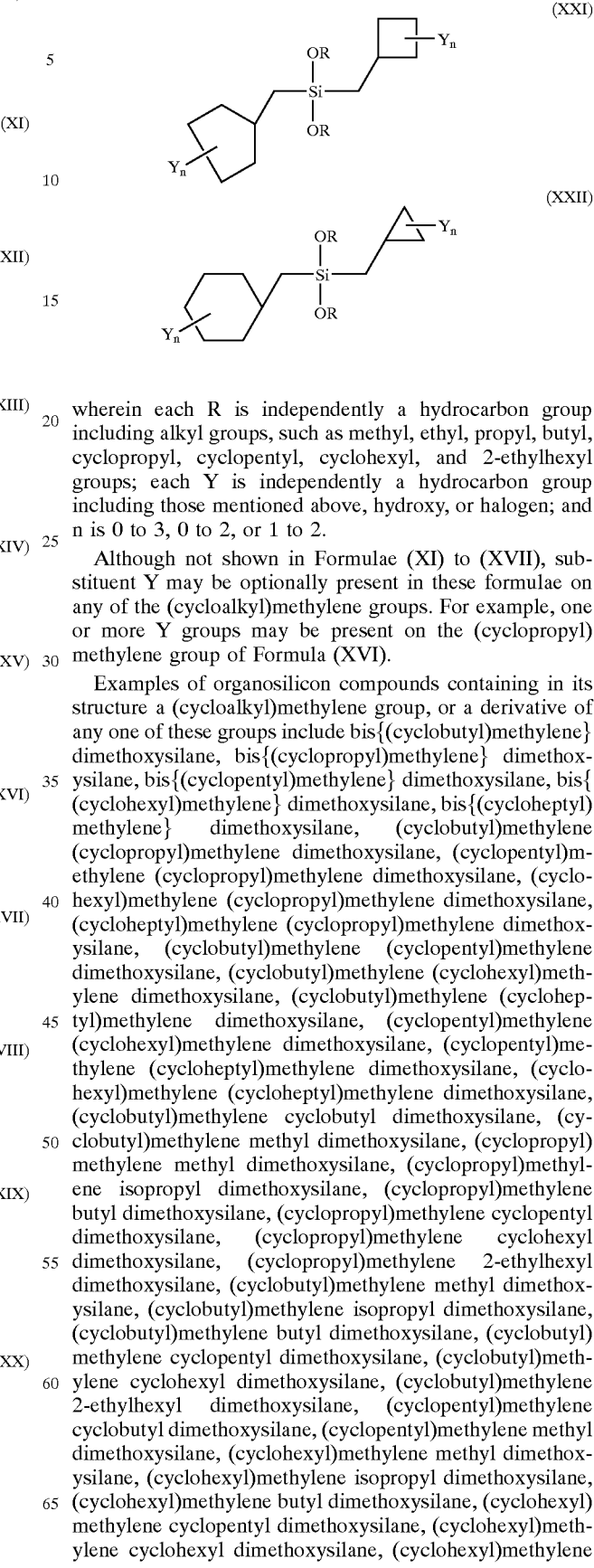

wherein each R is independently a hydrocarbon group including alkyl groups, such as methyl, ethyl, propyl, butyl, cyclopropyl, cyclopentyl, cyclohexyl, and 2-ethylhexyl groups; each Y is independently a hydrocarbon group including those mentioned above, hydroxy, or halogen; and n is 0 to 3, 0 to 2, or 1 to 2.

Although not shown in Formulae (XI) to (XVII), substituent Y may be optionally present in these formulae on any of the (cycloalkyl)methylene groups. For example, one or more Y groups may be present on the (cyclopropyl) methylene group of Formula (XVI).

Examples of organosilicon compounds containing in its structure a (cycloalkyl)methylene group, or a derivative of any one of these groups include bis{(cyclobutyl)methylene} dimethoxysilane, bis{(cyclopropyl)methylene} dimethoxysilane, bis{(cyclopentyl)methylene} dimethoxysilane, bis{(cyclohexyl)methylene} dimethoxysilane, bis{(cycloheptyl) methylene} dimethoxysilane, (cyclobutyl)methylene (cyclopropyl)methylene dimethoxysilane, (cyclopentyl)methylene (cyclopropyl)methylene dimethoxysilane, (cyclohexyl)methylene (cyclopropyl)methylene dimethoxysilane, (cycloheptyl)methylene (cyclopropyl)methylene dimethoxysilane, (cyclobutyl)methylene (cyclopentyl)methylene dimethoxysilane, (cyclobutyl)methylene (cyclohexyl)methylene dimethoxysilane, (cyclobutyl)methylene (cycloheptyl)methylene dimethoxysilane, (cyclopentyl)methylene (cyclohexyl)methylene dimethoxysilane, (cyclopentyl)methylene (cycloheptyl)methylene dimethoxysilane, (cyclohexyl)methylene (cycloheptyl)methylene dimethoxysilane, (cyclobutyl)methylene cyclobutyl dimethoxysilane, (cyclobutyl)methylene methyl dimethoxysilane, (cyclopropyl) methylene methyl dimethoxysilane, (cyclopropyl)methylene isopropyl dimethoxysilane, (cyclopropyl)methylene butyl dimethoxysilane, (cyclopropyl)methylene cyclopentyl dimethoxysilane, (cyclopropyl)methylene cyclohexyl dimethoxysilane, (cyclopropyl)methylene 2-ethylhexyl dimethoxysilane, (cyclobutyl)methylene methyl dimethoxysilane, (cyclobutyl)methylene isopropyl dimethoxysilane, (cyclobutyl)methylene butyl dimethoxysilane, (cyclobutyl) methylene cyclopentyl dimethoxysilane, (cyclobutyl)methylene cyclohexyl dimethoxysilane, (cyclobutyl)methylene 2-ethylhexyl dimethoxysilane, (cyclopentyl)methylene cyclobutyl dimethoxysilane, (cyclopentyl)methylene methyl dimethoxysilane, (cyclohexyl)methylene methyl dimethoxysilane, (cyclohexyl)methylene isopropyl dimethoxysilane, (cyclohexyl)methylene butyl dimethoxysilane, (cyclohexyl) methylene cyclopentyl dimethoxysilane, (cyclohexyl)methylene cyclohexyl dimethoxysilane, (cyclohexyl)methylene 2-ethylhexyl dimethoxysilane, (cyclopentyl)methylene methyl dimethoxysilane, (cyclopentyl)methylene isopropyl dimethoxysilane, (cyclopentyl)methylene butyl dimethoxysilane, (cyclopentyl)methylene cyclopentyl dimethoxysilane, (cyclopentyl)methylene cyclohexyl dimethoxysilane, (cyclopentyl)methylene 2-ethylhexyl dimethoxysilane, (cycloheptyl)methylene cyclobutyl dimethoxysilane, (cycloheptyl)methylene methyl dimethoxysilane, (cycloheptyl)methylene methyl dimethoxysilane, (cycloheptyl)methylene isopropyl dimethoxysilane, (cycloheptyl)methylene butyl dimethoxysilane, (cycloheptyl)methylene cyclopentyl dimethoxysilane, (cycloheptyl)methylene cyclohexyl dimethoxysilane, (cycloheptyl)methylene 2-ethylhexyl dimethoxysilane, (cyclopropyl)methylene trimethoxysilane, (cyclobutyl)methylene trimethoxysilane, (cyclopentyl)methylene trimethoxysilane, (cyclohexyl)methylene trimethoxysilane, (cycloheptyl)methylene trimethoxysilane, bis{(cyclobutyl)methylene} diethoxysilane, bis{(cyclopropyl)methylene} diethoxysilane, bis{(cyclopentyl)methylene} diethoxysilane, bis{(cyclohexyl)methylene} diethoxysilane, bis{(cycloheptyl)methylene} diethoxysilane, (cyclobutyl)methylene (cyclopropyl)methylene diethoxysilane, (cyclopentyl)methylene (cyclopropyl)methylene diethoxysilane, (cyclohexyl)methylene (cyclopropyl)methylene diethoxysilane, (cycloheptyl)methylene (cyclopropyl)methylene diethoxysilane, (cyclobutyl)methylene (cyclopentyl)methylene diethoxysilane, (cyclobutyl)methylene (cyclohexyl)methylene diethoxysilane, (cyclobutyl)methylene (cycloheptyl)methylene diethoxysilane, (cyclopentyl)methylene (cyclohexyl)methylene diethoxysilane, (cyclopentyl)methylene (cycloheptyl)methylene diethoxysilane, (cyclohexyl)methylene (cycloheptyl)methylene diethoxysilane, (cyclobutyl)methylene cyclobutyl diethoxysilane, (cyclobutyl)methylene methyl diethoxysilane, (cyclopropyl)methylene methyl diethoxysilane, (cyclopropyl)methylene isopropyl diethoxysilane, (cyclopropyl)methylene butyl diethoxysilane, (cyclopropyl)methylene cyclopentyl diethoxysilane, (cyclopropyl)methylene cyclohexyl diethoxysilane, (cyclopropyl)methylene 2-ethylhexyl diethoxysilane, (cyclobutyl)methylene methyl diethoxysilane, (cyclobutyl)methylene isopropyl diethoxysilane, (cyclobutyl)methylene butyl diethoxysilane, (cyclobutyl)methylene cyclopentyl diethoxysilane, (cyclobutyl)methylene cyclohexyl diethoxysilane, (cyclobutyl)methylene 2-ethylhexyl diethoxysilane, (cyclopentyl)methylene cyclobutyl diethoxysilane, (cyclopentyl)methylene methyl diethoxysilane, (cyclohexyl)methylene methyl diethoxysilane, (cyclohexyl)methylene isopropyl diethoxysilane, (cyclohexyl)methylene butyl diethoxysilane, (cyclohexyl)methylene cyclopentyl diethoxysilane, (cyclohexyl)methylene cyclohexyl diethoxysilane, (cyclohexyl)methylene 2-ethylhexyl diethoxysilane, (cyclopentyl)methylene methyl diethoxysilane, (cyclopentyl)methylene isopropyl diethoxysilane, (cyclopentyl)methylene butyl diethoxysilane, (cyclopentyl)methylene cyclopentyl diethoxysilane, (cyclopentyl)methylene cyclohexyl diethoxysilane, (cyclopentyl)methylene 2-ethylhexyl diethoxysilane, (cycloheptyl)methylene cyclobutyl diethoxysilane, (cycloheptyl)methylene methyl diethoxysilane, (cycloheptyl)methylene methyl diethoxysilane, (cycloheptyl)methylene isopropyl diethoxysilane, (cycloheptyl)methylene butyl diethoxysilane, (cycloheptyl)methylene cyclopentyl diethoxysilane, (cycloheptyl)methylene cyclohexyl diethoxysilane, (cycloheptyl)methylene 2-ethylhexyl diethoxysilane, (cyclopropyl)methylene triethoxysilane, (cyclobutyl)methylene triethoxysilane, (cyclopentyl)methylene triethoxysilane, (cyclohexyl)methylene triethoxysilane, and (cycloheptyl)methylene triethoxysilane.

The (cycloalkyl)methylene organosilicon compounds can be prepared by various methods. In one method, one or two equivalents of a cyclopropyl/cyclobutyl Gringnard reagent (i.e., a Grignard reagent having a (cyclopropyl)methylene or (cyclobutyl)methylene group, respectively) is reacted with an orthosilicate, such as tetramethylorthosilicate or tetraethylorthosilicate. The reactant is then purified by vacuum distillation, if appropriate. Tetramethylorthosilicate and tetraethylorthosilicate are made by reacting silicon tetrachloride with either four equivalents of methanol or ethanol.

Examples of Grignard reagents having a (cycloalkyl) methylene group include those represented by Formula (XXIII)

MgXR$^{13}$ (XXIII)

wherein X is a halogen atom such as chlorine or bromine, and R$^{13}$ is an organic group containing a (cycloalkyl)methylene group. Examples of organic groups include a substituted or unsubstituted (cyclopropyl)methylene group, a substituted or unsubstituted (cyclobutyl)methylene group, a substituted or unsubstituted (cyclopentyl)methylene group, a substituted or unsubstituted (cyclohexyl)methylene group, and a substituted or unsubstituted (cycloheptyl)methylene group.

In another method, the organosilicon compound catalyst system component is obtained by the reaction of a mono-cycloalkyltrialkoxysilane (i.e., mono(cyclopropyl)methylene-, mono(cyclobutyl)methylene-, mono(cyclopentyl)methylene-, mono(cyclohexyl)methylene-, mono(cycloheptyl)methylene-trialkoxysilane) with a (cycloalkyl)methylene Grignard reagent. For example, (cyclopropyl)chloromethane is first reacted with magnesium in the presence of a solvent, e.g., an ether such as tetrahydrofuran, diethyl ether, or di-n-butyl ether, to yield a (cyclopropyl)methylene Grignard reagent ((cyclopropyl)methylene magnesium chloride). This reaction may be carried out at a temperature from about room temperature to about 60° C. The (cyclopropyl) methylene Grignard reagent is then reacted with (cyclopropyl)methylene trimethoxysilane to obtain bis{(cyclopropyl)methylene} dimethoxysilane; this reaction may be conducted in the presence of an ether such as tetrahydrofuran, diethyl ether, or di-n-butyl ether, or in the presence of an aliphatic hydrocarbon solvent such as hexane or heptane or an aromatic hydrocarbon solvent such as toluene, benzene, or xylene. This reaction may be carried out at a temperature from about 50° C. to about 200° C., preferably at a temperature from about 100° C. to about 200° C. or at a temperature from about 100° C. to about 200° C. under boiling or refluxing of the solvent.

Although the mono(cycloalkyl)methylenetrialkoxysilane for use in the above reaction may be a commercial product, it may be prepared by various known methods. In one method, the desired compound is prepared by reacting (cycloalkyl)methylenetrichlorosilane with methanol to alkoxylate the silane compound with the evolution of hydrogen chloride. Although the (cycloalkyl)methylenetrichlorosilane for use in this reaction may be a commercial product, it may be prepared by the hydrosilylation reaction of (cycloalkyl)methane with trichlorosilane (HSiCl$_3$).

The (cycloalkyl)methylene organosilicon compounds thus produced can be identified by one or more of nuclear magnetic resonance spectroscopy ($^1$HNMR, $^{13}$C-NMR), infrared absorption spectroscopy, gas chromatography-mass spectrometry, etc.

The organosilicon compound of the present invention, when used as an external electron donor serving as one component of a Ziegler-Natta catalyst system for olefin polymerization, contributes to the ability to obtain a polymer (at least a portion of which is polyolefin) having a broad molecular weight distribution and controllable crystallinity while retaining high performance with respect to catalytic activity and the yield of highly stereoregular polymer.

In another embodiment, the organosilicon compound of the catalyst system is one or more organosilicon compounds represented by Formula (XXIV):

$$R^{14}{}_n Si(OCR^{15})_{4-n} \qquad (XXIV)$$

wherein $R^{14}$ and $R^{15}$ represent a hydrocarbon group containing from about 1 to about 10 carbon atoms, and n is $0 \leq n < 4$.

Specific examples of the supplementary organosilicon compounds of Formula (XXIV) include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyidimethoxysilane, bis-m-tolyldimethoxysilane, bis-p-tolyidimethoxysilane, bis-p-totyldiethoxysilane, bisethylphenyldimethoxysilane, dicyclohexyyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norboranetriethoxysilane, 2-norbornanemethyldimethoxysilane, ethyl silicate, butyl silicate, trimethylphenoxysilane, methyltriallyloxysilane, vinyltris(betamethoxyethoxysilane), vinyltriacetoxysilane, and dimethyltetraethoxydisiloxane.

In another aspect of the present invention, the organosilicon compound is represented by Formula (XXV)

$$SiR^{21}R^{22}_m(OR^{23})_{3-m} \qquad (XXV)$$

In the above Formula (XXV), $0 \leq m < 3$, such as $0 \leq m \leq 2$; and $R^{21}$ represents a cyclopropyl group, cyclobutyl group, cyclopentyl group, a cyclopentenyl group, a cyclopentadienyl group or a derivative of any of these. The derivative may preferably be, for example, a cyclopentyl group substituted by 1 to about 4 alkyl groups having 1 to about 4 carbon atoms, an alkyl group having 2 to about 4 carbon atoms substituted by a cyclopentyl group which may be substituted by 1 to about 4 alkyl groups having 1 to about 4 carbon atoms, a cyclopentenyl group substituted by 1 to about 4 alkyl groups having 1 to about 4 carbon atoms, a cyclopentadienyl group substituted by 1 to about 4 alkyl groups having 1 to about 4 carbon atoms, or an indenyl, indanyl, tetrahydroindenyl or fluorenyl group which may be substituted by 1 to about 4 alkyl groups having 1 to about 4 carbon atoms.

Specific examples of the group $R^{21}$ include cyclopropyl, cyclobutyl, cyclopentyl, 2-methylcyclopentyl, 3-methylcyclopentyl, 2-ethylcyclopentyl, 3-propylcyclopentyl, 3-isopropylcyclopentyl, 3-butylcyclopentyl, 3-tertiary butyl cyclopentyl, 2,2-dimethylcyclopentyl, 2,3-dimethylcyclopentyl, 2,5-dimethylcyclopentyl, 2,2,5-trimethylcyclopentyl, 2,3,4,5-tetramethylcyclopentyl, 2,2,5,5-tetramethylcyclopentyl, 1-cyclopentylpropyl, 1-methyl-1-cyclopentylethyl, cyclopentenyl, 2-cyclopentenyl, 3-cyclopentenyl, 2-methyl-1-cyclopentenyl, 2-methyl-3-cyclopentenyl, 3-methyl-3-cyclopentenyl, 2-ethyl-3-cyclopentenyl, 2,2-dimethyl-3-cyclopentenyl, 2,5-dimethyl-3-cyclopentenyl, 2,3,4,5-tetramethyl-3-cyclopentenyl, 2,2,5,5-tetramethyl-3-cyclopentenyl, 1,3-cyclopentadienyl, 2,4-cyclopentadienyl, 1,4-cyclopentadienyl, 2-methyl-1,3-cyclopentadienyl, 2-methyl-2,4-cyclopentadienyl, 3-methyl-2,4-cyclopentadienyl, 2-ethyl-2,4-cyclopentadienyl, 2-dimethyl-2,4-cyclopentadienyl, 2,3-dimethyl-2,4-cyclopentadienyl, 2,5-dimethyl-2,4-cyclopentadienyl, 2,3,4,5-tetramethyl-2,4-cyclopentadienyl, indenyl, 2-methylindenyl, 2-ethylindenyl, 2-indenyl, 1-methyl-2-indenyl, 1,3-dimethyl-2-indenyl, indanyl, 2-methylindanyl, 2-indanyl, 1,3-dimethyl-2-indanyl, 4,5,6,7-tetrahydroindenyl, 4,5,6,7-tetrahydro-2-indenyl, 4,5,6,7-tetrahydro-1-methyl-2-indenyl, 4,5,6,7-tetrahydro-1,3-dimethyl-2-indenyl, and fluorenyl groups.

In Formula (XXV), $R^{22}$ and $R^{23}$ are identical or different and each represents a hydrocarbon. Examples of $R^{22}$ and $R^{23}$ are alkyl, cycloalkyl, aryl and aralkyl groups having 3 or more carbon atoms. Furthermore, $R^{21}$ and $R^{22}$ may be bridged by an alkyl group, etc. General examples of organosilicon compounds are those of Formula (XXV) in which $R^{21}$ is a cyclopentyl group, $R^{22}$ is an alkyl group or a cyclopentyl group, and $R^{23}$ is an alkyl group, particularly a methyl or ethyl group.

Specific examples of organosilicon compounds of Formula (XXV) include trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyidimethoxysilane, bis(2-methylcyclopentyl) dimethoxysilane, bis(3-tertiary butylcyclopentyl) dimethoxysilane, bis(2,3-dimethylcyclopentyl) dimethoxysilane, bis(2,5-dimethylcyclopentyl) dimethoxysilane, dicyclopentyldiethoxysilane, dicyclobutyidiethoxysilane, cyclopropylcyclobutyldiethoxysilane, dicyclopentenyidimethoxysilane, di(3-cyclopentenyl)dimethoxysilane, bis(2,5-dimethyl-3-cyclopentenyl)dimethoxysilane, di-2,4-cyclopentadienyl) dimethoxysilane, bis(2,5-dimethyl-2,4-cyclopentadienyldimethoxysilane, bis(1-methyl-1-cyclopentylethyl)dimethoxysilane, cyclopentylcyclopentenyidimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyidiethylmethoxysilane, cyclopentyidimethylethoxysilane, bis(2,5-dimethylcyclopentyl)cyclopentylmethoxysilane, dicyclopentylcyclopentenylmethoxysilane, dicyclopentylcyclopentadienylmethoxysilane and diindenylcyclopentylmethoxysilane; and ethylenebis-cyclopentyldimethoxysilane.

Polymerization of olefins in accordance with the present invention is carried out in the presence of the catalyst system described above. Generally speaking, olefins are contacted with the catalyst system described above under suitable conditions to form desired polymer products. In one embodiment, preliminary polymerization described below is carried out before the main polymerization. In another embodiment, polymerization is carried out without preliminary polymerization. In yet another embodiment, the formation of impact copolymer is carried out using at least two polymerization zones.

In preliminary polymerization, the solid titanium catalyst component is usually employed in combination with at least a portion of the organoaluminum compound. This may be carried out in the presence of part or the whole of the organosilicon compound (external electron donor). The concentration of the catalyst system used in the preliminary polymerization may be much higher than that in the reaction system of the main polymerization.

In preliminary polymerization, the concentration of the solid titanium catalyst component in the preliminary polymerization is usually from about 0.01 to about 200 millimoles, preferably from about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and reacting the olefin under mild conditions.

Specific examples of the inert hydrocarbon medium include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. In the present invention, a liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization is sufficient for the resulting preliminary polymer to not substantially dissolve in the inert hydrocarbon medium. In one embodiment, the temperature is from about −20° C. to about 100° C. In another embodiment, the temperature is from about −10° C. to about 80° C. In yet another embodiment, the temperature is from about 0° C. to about 40° C.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decalin at 135° C., of at least about 0.2 dl/g, and preferably from about 0.5 to 10 dl/g.

In one embodiment, the preliminary polymerization is desirably carried out so that from about 0.1 g to about 1,000 g of a polymer forms per gram of the titanium catalyst component of the catalyst system. In another embodiment, the preliminary polymerization is desirably carried out so that from about 0.3 g to about 500 g of a polymer forms per gram of the titanium catalyst component. If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid titanium catalyst component, the organoaluminum compound and the organosilicon compound (external electron donor).

Examples of olefins that can be used in the main polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In the process of the present invention, these alpha-olefins may be used individually or in any combination.

In one embodiment, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, preferably at least about 70 mole %.

By performing the preliminary polymerization, the catalyst system in the main polymerization can be adjusted in the degree of activity. This adjustment tends to result in a powdery polymer having a high bulk density. Furthermore, when the preliminary polymerization is carried out, the particle shape of the resulting polymer becomes spherical, and in the case of slurry polymerization, the slurry attains excellent characteristics. Furthermore, in this embodiment, a polymer having a high stereoregularity index can be produced with a high catalytic efficiency by polymerizing an alpha-olefin having at least about 3 carbon atoms.

In the homopolymerization or copolymerization of these olefins, a polyunsaturated compound such as a conjugated diene or a non-conjugated diene may be used as a comonomer. Examples of comonomers include styrene, butadiene, acrylonitrile, acrylamide, alpha-methyl styrene, chlorostyrene, vinyl toluene, divinyl benzene, diallylphthalate, alkyl methacrylates and alkyl acrylates. In one embodiment, the comonomers include thermoplastic and elastomeric monomers.

In the process of the present invention, the main polymerization of an olefin is carried out usually in the gaseous or liquid phase.

In one embodiment, when the main polymerization is carried out in a slurry reaction mode, the aforesaid inert hydrocarbon may be used as a reaction solvent. In another embodiment, an olefin which is liquid at the reaction temperature may alternatively be used as the reaction solvent. In yet another embodiment, an inert hydrocarbon and an olefin which is liquid at the reaction temperature may be employed as the reaction solvent.

In one embodiment, polymerization (main polymerization) of the present invention employs a catalyst system containing the titanium catalyst component in an amount from about 0.001 to about 0.75 millimole calculated as Ti atom per liter of the volume of the polymerization zone, the organoaluminum compound in an amount from about 1 to about 2,000 moles per mole of titanium atoms in the titanium catalyst component, and the organosilicon compound (external donor) in an amount from about 0.001 to about 10 moles calculated as Si atoms in the organosilicon compound per mol of the metal atoms in the organoaluminum compound. In another embodiment, polymerization employs a catalyst system containing the titanium catalyst component in an amount from about 0.005 to about 0.5 millimole calculated as Ti atom per liter of the volume of the polymerization zone, the organoaluminum compound in an amount from about 5 to about 500 moles per mole of titanium atoms in the titanium catalyst component, and the organosilicon compound in an amount from about 0.01 to about 2 moles calculated as Si atoms in the organosilicon compound per mol of the metal atoms in the organoaluminum compound. In yet another embodiment, polymerization employs a catalyst system containing the organosilicon compound in an amount from about 0.05 to about 1 mole calculated as Si atoms in the organosilicon compound per mol of the metal atoms in the organoaluminum compound.

The catalyst system components may be contacted at the time of the main polymerization or during the preliminary polymerization before the main polymerization. In this contacting before the main polymerization, any desired two components may be selected and contacted with each other, followed by the third component. Alternatively, only portions of two or three components may be contacted with each other. The catalyst system ingredients may be contacted before polymerization in an inert gas atmosphere, or in an olefin atmosphere.

When the organoaluminum compound and the organosilicon compound are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen at the time of polymerization promotes and contributes to control of the molecular weight of the resulting polymer, and the polymer obtained may have a high melt flow rate. In this case, the stereoregularity index of the resulting polymer and the activity of the catalyst system are not decreased according to the methods of the present invention.

In one embodiment, the polymerization temperature of the present invention is from about 20° C. to about 200° C. In another embodiment, the polymerization temperature of the present invention is from about 50° C. to about 180° C. In one embodiment, the polymerization pressure is typically from about atmospheric pressure to about 100 kg/cm$^2$. In another embodiment, the polymerization pressure is typically from about 2 kg/cm$^2$ to about 50 kg/cm$^2$. The main polymerization may be carried out batchwise, semi-continuously or continuously. The polymerization may also be carried out in two or more stages under different reaction conditions.

The olefin polymer so obtained may be a homopolymer, a random copolymer, a block copolymer or an impact copolymer. The impact coplymer contains an intimate mixture of a polyolefin homopolymer and a polyolefin rubber. Examples of polyolefin rubbers include ethylene propylene rubbers (EPR) such as ethylene propylene methylene copolymer rubber (EPM) and ethylene propylene diene methylene terpolymer rubber (EPDM).

The olefin polymer obtained by using the catalyst system of the present invention has a very small amount of an amorphous polymer component and therefore a small amount of a hydrocarbon-soluble component. Accordingly, a film molded from this resultant polymer has low surface tackiness.

The polyolefin obtained by the process of the present invention is excellent in particle size distribution, particle diameter and bulk density, and the copolyolefin obtained has a narrow composition distribution. In an impact copolymer, excellent fluidity, low temperature resistance, and a desired balance between stiffness and elasticity can be obtained.

In one embodiment of the present invention, propylene and an alpha-olefin having 2 or from about 4 to about 20 carbon atoms are copolymerized in the presence of the catalyst system described above. The catalyst system may be one subjected to the preliminary polymerization described above. In another embodiment of the present invention, propylene and an ethylene rubber are formed in two reactors coupled in series to form an impact copolymer.

By performing the preliminary polymerization, the catalyst system in the main polymerization can be adjusted in the degree of activity. This adjustment tends to result in a powdery polymer having a high bulk density. Furthermore, when the preliminary polymerization is carried out, the particle shape of the resulting polymer becomes spherical, and in the case of slurry polymerization, the slurry attains excellent characteristics. Accordingly, according to this embodiment of producing the propylene copolymer, the resulting copolymer powder or the copolymer slurry becomes easy to handle.

The alpha-olefin having 2 carbon atoms is ethylene, and examples of the alpha-olefins having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be copolymerized with two or more such alpha-olefins. For example, it is possible to copolymerize propylene with ethylene and 1-butene. In one embodiment, propylene is copolymerized with ethylene, 1-butene, or ethylene and 1-butene.

Block copolymerization of propylene and another alpha-olefin may be carried out in two stages. The polymerization in a first stage may be the homopolymerization of propylene or the copolymerization of propylene with the other alpha-olefin. In one embodiment, the amount of the monomers polymerized in the first stage is from about 50 to about 95% by weight. In another embodiment, the amount of the monomers polymerized in the first stage is from about 60 to about 90% by weight. In the present invention, this first stage polymerization may, as required be carried out in two or more stages under the same or different polymerization conditions.

In one embodiment, the polymerization in a second stage is desirably carried out such that the mole ratio of propylene to the other alpha-olefin(s) is from about 10/90 to about 90/10. In another embodiment, the polymerization in a second stage is desirably carried out such that the mole ratio of propylene to the other alpha-olefin(s) is from about 20/80 to about 80/20. In yet another embodiment, the polymerization in a second stage is desirably carried out such that the mole ratio of propylene to the other alpha-olefin(s) is from about 30/70 to about 70/30. The step of producing a crystalline polymer or copolymer of another alpha-olefin may be provided in the second polymerization stage.

The propylene copolymer so obtained may be a random copolymer or the above-described block copolymer. This propylene copolymer typically contains from about 7 to about 50 mole % of units derived from the alpha-olefin having 2 or from about 4 to about 20 carbon atoms. In one embodiment, a propylene random copolymer contains from about 7 to about 20 mole % of units derived from the alpha-olefin having 2 or from about 4 to about 20 carbon atoms. In another embodiment, the propylene block copolymer contains from about 10 to about 50 mole % of units derived from the alpha-olefin having 2 or 4–20 carbon atoms.

In another one embodiment, copolymers made with the catalyst system of the present invention contain from about 50% to about 99% by weight poly-alpha-olefins and from about 1% to about 50% by weight comonomers (such as thermoplastic or elastomeric monomers). In another embodiment, copolymers made with the catalyst system of the present invention contain from about 75% to about 98% by weight poly-alpha-olefins and from about 2% to about 25% by weight comonomers.

It should be understood that where there is no reference to the polyunsaturated compound that can be used, the method of polymerization, the amount of the catalyst system and the polymerization conditions, the same description as the above embodiments are applicable.

The catalysts/methods of the present invention can in some instances lead to the production of poly-alpha-olefins having xylene solubles (XS) from about 0.5% to about 10%. In another embodiment, poly-alpha-olefins having xylene solubles (XS) from about 1% to about 6% are produced in accordance with the present invention. XS refers to the percent of solid polymer that dissolves into xylene. A low XS % value generally corresponds to a highly isotactic polymer (i.e., higher crystallinity), whereas a high XS % value generally corresponds to a low isotactic polymer.

In one embodiment, the catalyst efficiency (measured as kilogram of polymer produced per gram of catalyst) of the catalyst system of the present invention is at least about 25. In another embodiment, the catalyst efficiency of the catalyst system of the present invention is at least about 30. In yet another embodiment, the catalyst efficiency of the catalyst system of the present invention is at least about 35.

The catalysts/methods of the present invention can in some instances lead to the production of poly-alpha-olefins having melt flow indexes (MFI) from about 3 to about 9. For example, in one embodiment, an impact polypropylene-ethylenepropylene rubber product has an MFI from about 4 to about 8. In another embodiment, an impact polypropylene-ethylenepropylene rubber product has an MFI from about 5 to about 7. In some instances a relatively high MFI indicates that a relatively high catalyst efficiency is obtainable. The MFI (flow rate) is measured according to ASTM standard D 1238.

The catalysts/methods of the present invention lead to the production of poly-alpha-olefins having a relatively narrow molecular weight distribution. In one embodiment, the Mw/Mn of a polypropylene polymer made with a catalyst system containing a catalyst support made using an alkyl silicate is from about 2 to about 6. In another embodiment, the Mw/Mn of a polypropylene polymer made with a catalyst system containing a catalyst support made using an alkyl silicate is from about 3 to about 5.

According to this invention, a polypropylene based impact polymer having a low melting point can be obtained in a large amount and a high yield. In addition, the amount of the by-product hydrocarbon-soluble copolymer can be reduced. Since the amount of the copolymer yielded per unit amount of titanium is large, an operation of removing the catalyst after the polymerization can be omitted.

The present invention can produce a propylene block copolymer and impact copolymers including polypropylene based impact copolymers having one or more of excellent melt-flowability, moldability, desirable balance between rigidity and elasticity, good stereospecific control, good control over size, shape, size distribution, and molecular weight distribution, impact strength and impact strength with a high catalytic efficiency and/or good operability. Employing the catalyst systems containing a catalyst support made using an alkyl silicate according to the present invention yields catalysts simultaneously having high catalytic efficiency and one or more of excellent melt-flowability, extrudability, moldability, rigidity-elasticity, impact strength and impact strength.

Examples of systems for polymerizing olefins are now described. Referring to FIG. 1, a high level schematic diagram of a system 10 for polymerizing olefins is shown. Inlet 12 is used to introduce into a reactor 14 catalyst system components, olefins, optional comonomers, hydrogen gas, fluid media, pH adjusters, surfactants, and any other additives. Although only one inlet is shown, many often are employed. Reactor 14 is any suitable vehicle that can polymerize olefins. Examples of reactors 14 include a single reactor, a series of two or more reactors, slurry reactors, fixed bed reactors, gas phase reactors, fluidized gas reactors, loop reactors, multizone circulating reactors, and the like. Once polymerization is complete, or as polyolefins are produced, the polymer product is removed from the reactor 14 via outlet 16 which leads to a collector 18. Collector 18 may include downstream processing, such as heating, extrusion, molding, and the like.

Figure 2:
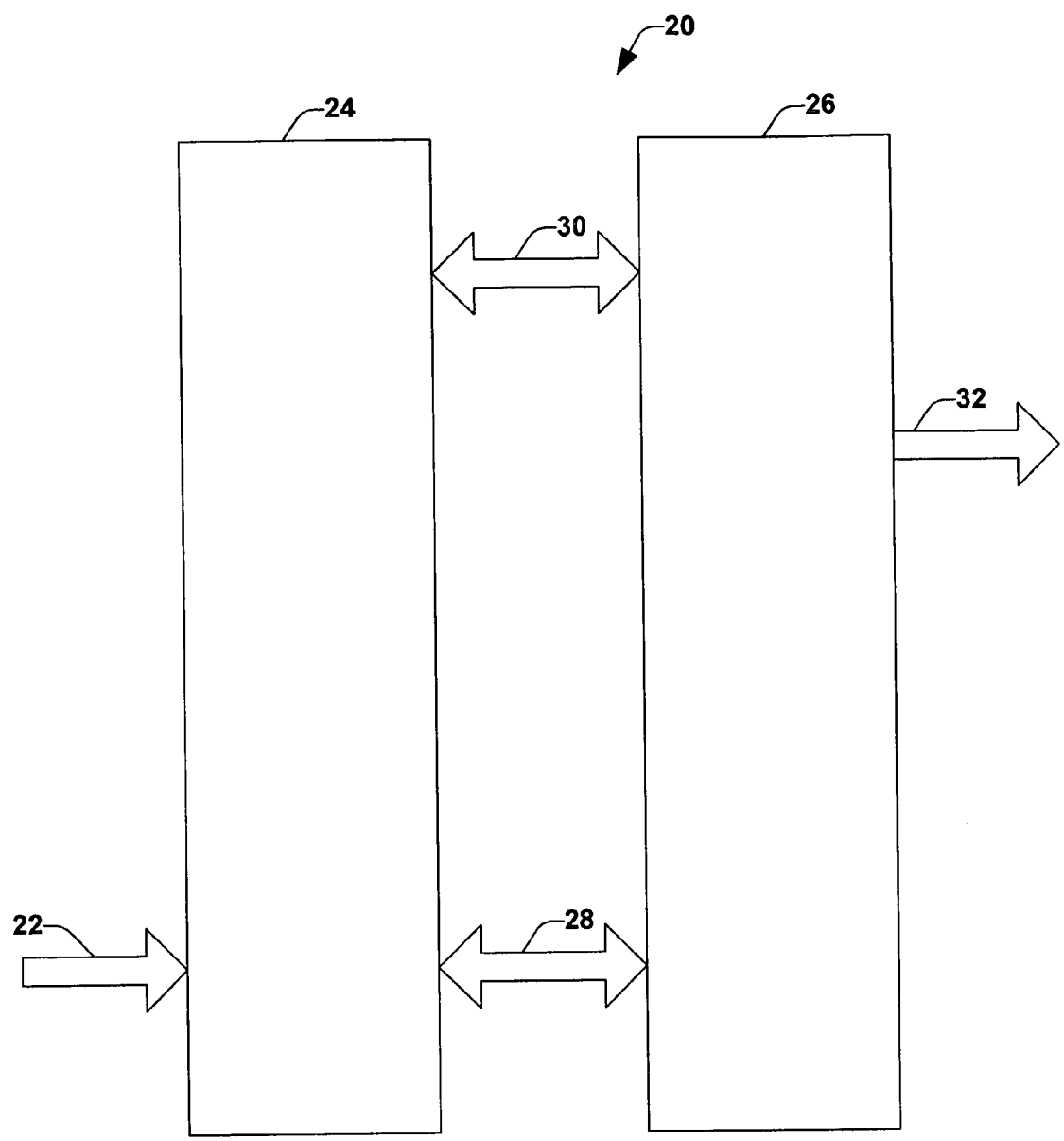
FIG. 2 is a schematic diagram of an olefin polymerization reactor in accordance with one aspect of the present invention.
Figure 3:
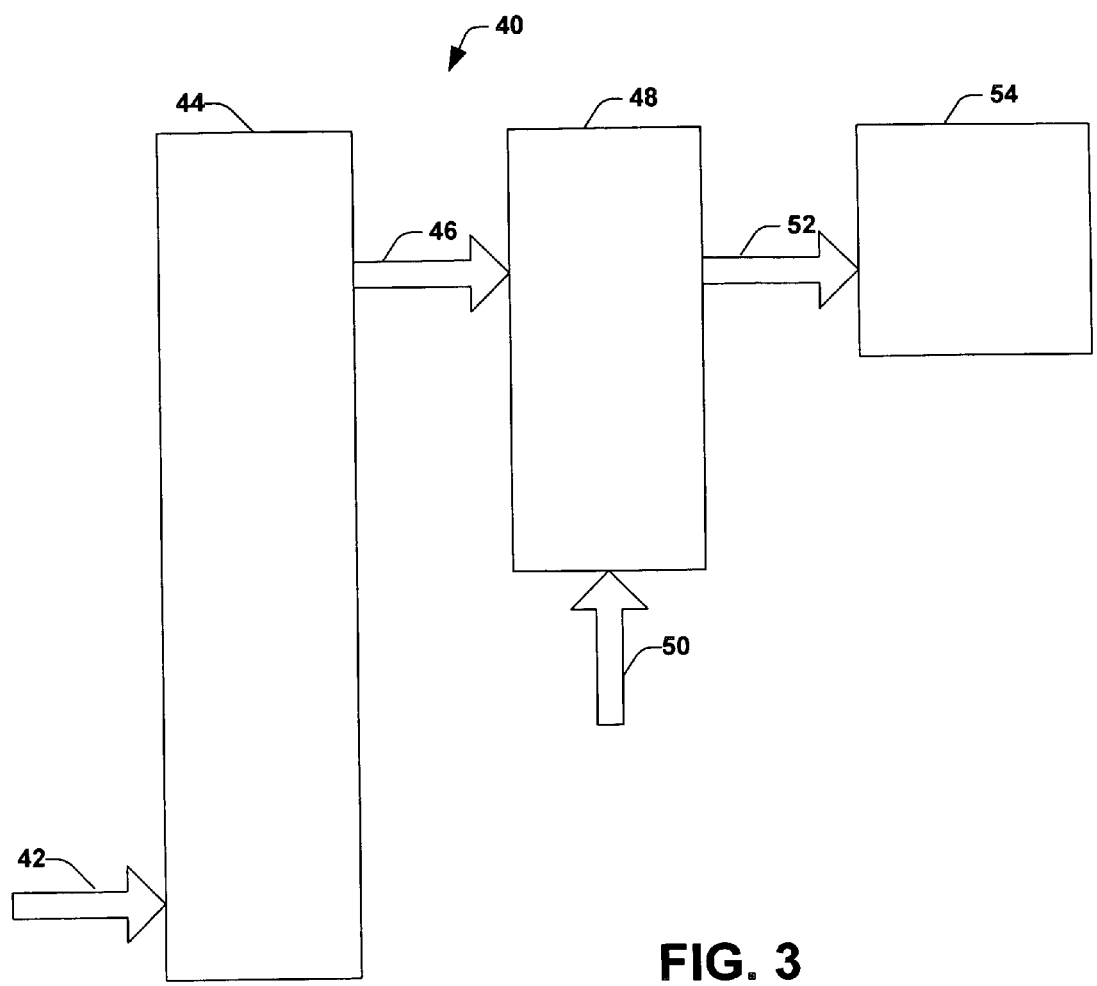
FIG. 3 is a high level schematic diagram of a system for making impact copolymer in accordance with one aspect of the present invention.

Referring to FIG. 2, a schematic diagram of a multizone circulating reactor 20 that can be employed as the reactor 14 in FIG. 1 or reactor 44 in FIG. 3 for making polyolefins. The multizone circulating reactor 20 substitutes a series of separate reactors with a single reactor loop that permits different gas phase polymerization conditions in the two sides due to use of a liquid barrier. In the multizone circulating reactor 20, a first zone starts out rich in olefin monomer, and optionally one or more comonomers. A second zone is rich in hydrogen gas, and a high velocity gas flow divides the growing resin particles out loosely. The two zones produce resins of different molecular weight and/or monomer composition. Polymer granules grow as they circulate around the loop, building up alternating layers of each polymer fraction in an onion like fashion. Each polymer particle constitutes an intimate combination of both polymer fractions.

In operation, the polymer particles pass up through the fluidizing gas in an ascending side 24 of the loop and come down through the liquid monomer on a descending side 26. The same or different monomers (and again optionally one or more comonomers) can be added in the two reactor legs. The reactor uses the catalyst systems described above.

In the liquid/gas separation zone 30, hydrogen gas is removed to cool and recirculate. Polymer granules are then packed into the top of the descending side 26, where they then descend. Monomers are introduced as liquids in this section. Conditions in the top of the descending side 26 can be varied with different combinations and/or proportions of monomers in successive passes.

Referring to FIG. 3, a high level schematic diagram of another system 40 for polymerizing olefins is shown. This system is ideally suited to make impact copolymer. A reactor 44, such as a single reactor, a series of reactors, or the multizone circulating reactor is paired with a gas phase or fluidized bed reactor 48 downstream containing the catalyst systems described above to make impact copolymers with desirable impact to stiffness balance or greater softness than are made with conventional catalyst systems. Inlet 42 is used to introduce into the reactor 44 catalyst system components, olefins, optional comonomers, hydrogen gas, fluid media, pH adjusters, surfactants, and any other additives. Although only one inlet is shown, many often are employed. Through transfer means 46 the polyolefin made in the first reactor 44 is sent to a second reactor 48. Feed 50 is used to introduce catalyst system components, olefins, optional comonomers, fluid media, and any other additives. Again, although only one inlet is shown, many often are employed. Once the second polymerization is complete, or as impact copolymers are produced, the polymer product is removed from the second reactor 48 via outlet 52 which leads to a collector 54. Collector 54 may include downstream processing, such as heating, extrusion, molding, and the like.

When making an impact copolymer, polypropylene can be formed in the first reactor while an ethylene propylene rubber can be formed in the second reactor. In this polymerization, the ethylene propylene rubber in the second reactor is formed with the matrix (and particularly within the pores) of the polypropylene formed in the first reactor. Consequently, an intimate mixture of an impact copolymer is formed, wherein the polymer product appears as a single polymer product. Such an intimate mixture cannot be made by simply mixing a polypropylene product with an ethylene propylene rubber product.

Although not shown in any of the figures, the systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (temperature, reaction time, pH, etc.) of the reactions, and the like, as instructed by the processor. The processor may contain or be coupled to a memory that contains data concerning various aspects of the polymerization process and/or the systems involved in the polymerization process.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

21 g Magnesium chloride is dissolved in 41.2 g ethanol at 120° C. for 2 hours, 16 ml tetraethylorthosilicate (TEOS) is added afterwards and kept for 1 hour at 120° C. Then 452 ml mineral oil is added to the reactor and kept at 120° C. for 1 hour over 1000 rpm. The emulsified MgCl$_2$-ethanol is transferred to hexane cooled by dry ice. The solid is washed three times by hexane and dried under nitrogen overnight.

EXAMPLE 2

Example 1 is repeated but 20 ml TEOS is added.

EXAMPLE 3

Example 1 is repeated but 32 ml TEOS is added.

EXAMPLE 4

Example 3 is repeated but 33.5 g ethanol is added and 600 rpm is used.

EXAMPLE 5

Example 2 is repeated but 300 ml mineral oil is added.

The catalyst supports are described in Table 1. D50 refers to an average diameter of particles on a 50% by volume basis as determined by a Malvern Instrument.

TABLE 1

| Example | rpm | D50 (μm) | Morphology |
|---|---|---|---|
| 1 | 1000 | 80 | spherical |
| 2 | 1000 | 63 | spherical |
| 3 | 1000 | 40 | spherical |
| 4 | 600 | 63 | spherical |
| 5 | 1000 | 54 | spherical |

EXAMPLES 6–8

The above support is dealcoholed then slurred in hexane or directly slurried in hexane and cooled down −28° C. in a Buchi reactor. Example 6 below employs the support formed in Example 1 above, Example 7 below employs the support formed in Example 2 above, and Example 8 below employs the support formed in Example 3 above. Then, 150 ml TiCl$_4$ is added to reactor over 1.5 hours at −25° C. The reactor temperature is slowly raised to 80° C. and 5 ml dibutyl phthalate is added and cooked at 80° C. for 1 hour. 45.7 g TiCl$_4$ and 206.8 g toluene are added to activate the intermediate four times. The final catalyst is washed with hexane four times before drying under nitrogen. 1.5 ml of 25% triethyl aluminum in heptane is injected into the 3.4 liter reactor at 30° C. which is exclusive of air and moisture by nitrogen purge. 0.6 ml 0.128 M cyclohexyl methyl dimethoxy silane and 10 mg catalyst in mineral oil is charged to the reactor. Then 3.5 pounds of hydrogen gas are charged into the reactor. Then, 1500 ml of liquid propylene is added into the reactor. The polymerization of propylene proceeds for 1 hour at 70° C. At the end of polymerization, the reactor is cooled down to 20° C. The polypropylene is completely dried in a vacuum oven.

The characteristics of polymer product and process of making are summarized in Table 2. CE refers to catalytic efficiency, BD refers to bulk density, XS refers to xylene solubles, MFI refers to melt flow index, and D50 refers to an average diameter of polymer product on a 50% by volume basis as determined by a Malvern Instrument.

TABLE 2

| Example | CE kg/g | BD cc/g | XS wt % | MFI g/10 min | D50 μm |
|---|---|---|---|---|---|
| 6 | 38.7 | 0.411 | 3.37 | 5.4 | 1503 |
| 7 | 49 | 0.358 | 3.99 | 6.1 | 1650 |
| 8 | 50.9 | 0.415 | 2.03 | 4.8 | 1073.8 |

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A catalyst system for the polymerization of an olefin comprising:
    a solid titanium catalyst component having a substantially spherical shape and a diameter from about 30 microns to about 150 microns (on a 50% by volume basis), the solid titanium catalyst component comprising a titanium compound and a support made from a magnesium compound and an alkyl silicate, wherein the alkyl silicate comprises at least one selected from the group consisting of tetramethylorthosilicate, tetraethylorthosilicate, tetrapropylorthosilicate, tetrabutylorthosilicate, and diethyldimethylorthosilicate;
    an organoaluminum compound having at least one aluminum-carbon bond; and
    an organosilicon compound.

2. The catalyst system of claim 1, wherein the alkyl silicate comprises tetraethylorthosilicate.

3. The catalyst system of claim 1, wherein the alkyl silicate comprises at least one selected from the group consisting of tetramethylorthosilicate, tetraethylorthosilicate, and tetrapropylorthosilicate.

4. The catalyst system of claim 1, wherein the magnesium compound comprises at least one selected from the group consisting of magnesium chloride, magnesium bromide, magnesium iodide, magnesium fluoride, methoxy magnesium chloride, ethoxy magnesium chloride, isopropoxy magnesium chloride, butoxy magnesium chloride, octoxy magnesium chloride, phenoxy magnesium chloride, methylphenoxy magnesium chloride, ethoxy magnesium, isopropoxy magnesium, butoxy magnesium, n-octoxy magnesium, 2-ethylhexoxy magnesium, phenoxy magnesium, dimethylphenoxy magnesium, magnesium laurate, and magnesium stearate.

5. The catalyst system of claim 1, wherein the catalyst composite has a diameter from about 40 microns to about 100 microns (on a 50% by volume basis).

6. A solid titanium catalyst component for the production of an impact copolymer comprising:
    a titanium compound; and
    a support made from a magnesium compound and an alkyl silicate, wherein the alkyl silicate comprises at least one selected from the group consisting of tetramethylorthosilicate, tetraethylorthosilicate, tetrapropylorthosilicate, tetrabutylorthosilicate, and diethyldimethylorthosilicate,
    the solid titanium catalyst component having a substantially spherical shape and a diameter from about 30 microns to about 150 microns (on a 50% by volume basis).

7. The solid titanium catalyst component of claim 6, wherein the alkyl silicate comprises tetraethylorthosilicate.

8. The solid titanium catalyst component of claim 6, wherein the titanium compound comprises at least one selected from the group consisting of titanium tetrahalides, alkoxytitanium trihalides, dialkoxytitanium dihalides, trialkoxytitanium monohalides, and tetraalkoxytitaniums.

9. The solid titanium catalyst component of claim 6 further comprising an internal electron donor.

10. A method of making a catalyst support for a catalyst system used for the production of an impact copolymer, comprising:
    contacting a magnesium compound and an alkyl silicate in a liquid medium to form a mixture, the liquid medium comprising an alcohol; and
    heating the mixture to form a substantially spherical catalyst support having a diameter from about 30 microns to about 150 microns (on a 50% by volume basis).

11. The method of claim 10, wherein the liquid medium comprises at least one selected from the group consisting of methanol, ethanol, propanol, butanol, pentanol, hexanol, and cyclohexanol.

12. The method of claim 10 further comprising emulsifying the mixture.

13. The method of claim 10, wherein the mixture is heated for a time from about 5 minutes to about 15 hours.

14. The method of claim 10, wherein the mixture is heated to a temperature from about 40° C. to about 200° C.

15. The method of claim 10, wherein the catalyst support has a diameter from about 40 microns to about 100 microns (on a 50% by volume basis).

16. A method of making an impact copolymer, comprising:
    polymerizing an olefin to provide a polyolefin matrix by contacting the olefin with a first catalyst system comprising a first solid titanium catalyst component having a substantially spherical shape and a diameter from about 30 microns to about 150 microns (on a 50% by volume basis), the first solid titanium catalyst component comprising a first titanium compound and a first support made from a magnesium compound and an alkyl silicate, a first organoaluminum compound having at least one aluminum-carbon bond, and a first organosilicon compound; and
    polymerizing a polyolefin rubber within the polyolefin matrix by contacting the polyolefin rubber with a second catalyst system in the presence of the polyolefin matrix, the second catalyst system comprising a second solid titanium catalyst component having a substantially spherical shape and a diameter from about 30 microns to about 150 microns (on a 50% by volume basis), the second solid titanium catalyst component comprising a second titanium compound and a second support made from a second magnesium compound and a second alkyl silicate.

17. The method of claim 16, wherein the first and second alkyl silicates are independently selected from the group consisting of tetramethylorthosilicate, tetraethylorthosilicate, tetrapropylorthosilicate, tetrabutylorthosilicate, and diethyldimethylorthosilicate.

18. The method of claim 16, wherein polymerizing the olefin is conducted in a first reactor and polymerizing the polyolefin rubber is conducted in a gas phase reactor or a fluidized bed reactor connected in series with the first reactor.

19. The method of claim 16, wherein the impact copolymer has a substantially spherical shape and an average diameter of about 500 microns or more (on a 50% by volume basis).

20. The method of claim 16, wherein the olefin comprises at least one selected from the group consisting of ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane.

21. The method of claim 16, wherein the polyolefin rubber comprises an ethylene propylene rubber.

* * * * *